Feb. 16, 1971     C. H. FLETCHER     3,563,861

PLURAL STAGE DISTILLATION PROCESS WITH FOAM CONTROL

Filed Aug. 19, 1968

INVENTOR.
CALVERT HUGH FLETCHER
BY Paul & Paul
ATTORNEYS.

United States Patent Office 3,563,861
Patented Feb. 16, 1971

---

3,563,861
PLURAL STAGE DISTILLATION PROCESS WITH FOAM CONTROL
Calvert H. Fletcher, Bowling Green, Ky., assignor to Detrex Chemical Industries, Inc., Detroit, Mich., a corporation of Michigan
Continuation-in-part of application Ser. No. 623,409, Mar. 15, 1967, now Patent No. 3,417,001, Dec. 17, 1968. This application Aug. 19, 1968, Ser. No. 753,412
The portion of the term of the patent subsequent to Dec. 17, 1985, has been disclaimed
Int. Cl. B01b *1/02;* B01d *19/02*
U.S. Cl. 203—20                                           1 Claim

ABSTRACT OF THE DISCLOSURE

A distillation system or still is disclosed having a multi-level evaporation system with continuously self-adjusting liquid level control and control of foaming. The system has particular application to reclaim of solvent in dry cleaning system. At least one, and preferably two auxiliary evaporation pans are mounted one above the other within the vapor zone above the main boil chamber. The contaminated solvent liquid is fed to the upper auxiliary pan for at least partial evaporation of moisture, and the liquid is discharged from the bottom of the upper auxiliary pan to the lower auxiliary pan (where used) for further partial evaporation of moisture. Liquid is discharged through the bottom of the lower auxiliary pan to the main boil chamber. The auxiliary evaporator pans and the main boil chamber each contain steam coils. Float control valves are provided to control the liquid level in each vessel. The liquid levels in the auxiliary pans and in the main boil chamber are so controlled that each of the steam coils is only partially submerged in the liquid, with the exposed portions of the coils projecting above the liquid level to a limited extent such that the exposed portions are bathed in liquid by the agitation of boiling. This has been found to provide controlled bubbling out of moisture and foam agents.

CROSS REFERENCE TO RELATED APPLICATION

This application is a continuation-in-part of my co-pending application Ser. No. 623,409, filed Mar. 15, 1967, entitled "Plural Stage Distillation Process and System with Foam Control," now U.S. Pat. 3,417,001, dated Dec. 17, 1968.

BACKGROUND OF THE INVENTION

This invention relates to a distillation process and apparatus particularly applicable for use in the distillation of dry cleaning solvent.

SUMMARY OF THE INVENTION

The processes ordinarily used in the dry cleaning of garments removes not only solid soils but also soluble soils, fatty acids, body salts and colored dyes from the garments being cleaned and tends to hold these contaminants in the cleaning solvent. The usual method of separating the soluble soils from the cleaning solvent is by distillation. The soluble soils ordinarily encountered have a higher boiling point than the cleaning solvent, which is usually perchlorethylene, and, accordingly, it is the solvent which is vaporized in the still. The solvent vapors and moisture (water) are conducted to a condensing area, and the resultant condensate is collected and passed through a water separator to separate the reclaimed solvent from the water. The soluble soils are left in the boil chamber of the still as residue. These soils accumulate in the boil chamber, and the boiling point of the mixture of the solids and residue rises until it is undesirably high with a result of reduction in the distillation rate. To correct the condition, the residues are drained from time to time from the boil chamber.

To aid in the dry cleaning process, it has become customary to use solvent soluble soaps and to introduce a small controlled amount of moisture into the solvent. However, the use of these aids increases the problem of distillation because the soap and moisture which are introduced into the boil chamber along with the solvent tend to interact with and emulsify the oily residues of the distillation and foaming tends to result. When foaming occurs, the dirty solvent, that is, the solvent containing the residues, is carried by the foam up into the condensating area and from there may be returned to the solvent storage tank. This, of course, must be avoided, and consequently it is important that foaming be controlled and minimized.

In my copending application, Ser. No. 623,409, filed Mar. 15, 1967, now U.S. Pat. 3,417,001, dated Dec. 17, 1968, a system is disclosed which reduces foaming while allowing the distillation rate to be carried on at maximum rate. The apparatus and system disclosed in the present application is generally similar to that disclosed in my said copending application, except that the present application discloses, and the claims are directed to, the importance of having the steam coils but partly submerged rather than fully submerged, with the exposed portion of the coils of limited height above the liquid level and sufficiently close thereto to be bathed in liquid by the agitation of boiling, thereby to provide controlled bubbling out of moisture and foam agents without exposing the coil and pan surfaces to a pure vapor atmosphere.

DESCRIPTION OF THE PREFERRED EMBODIMENT

Figure 1:
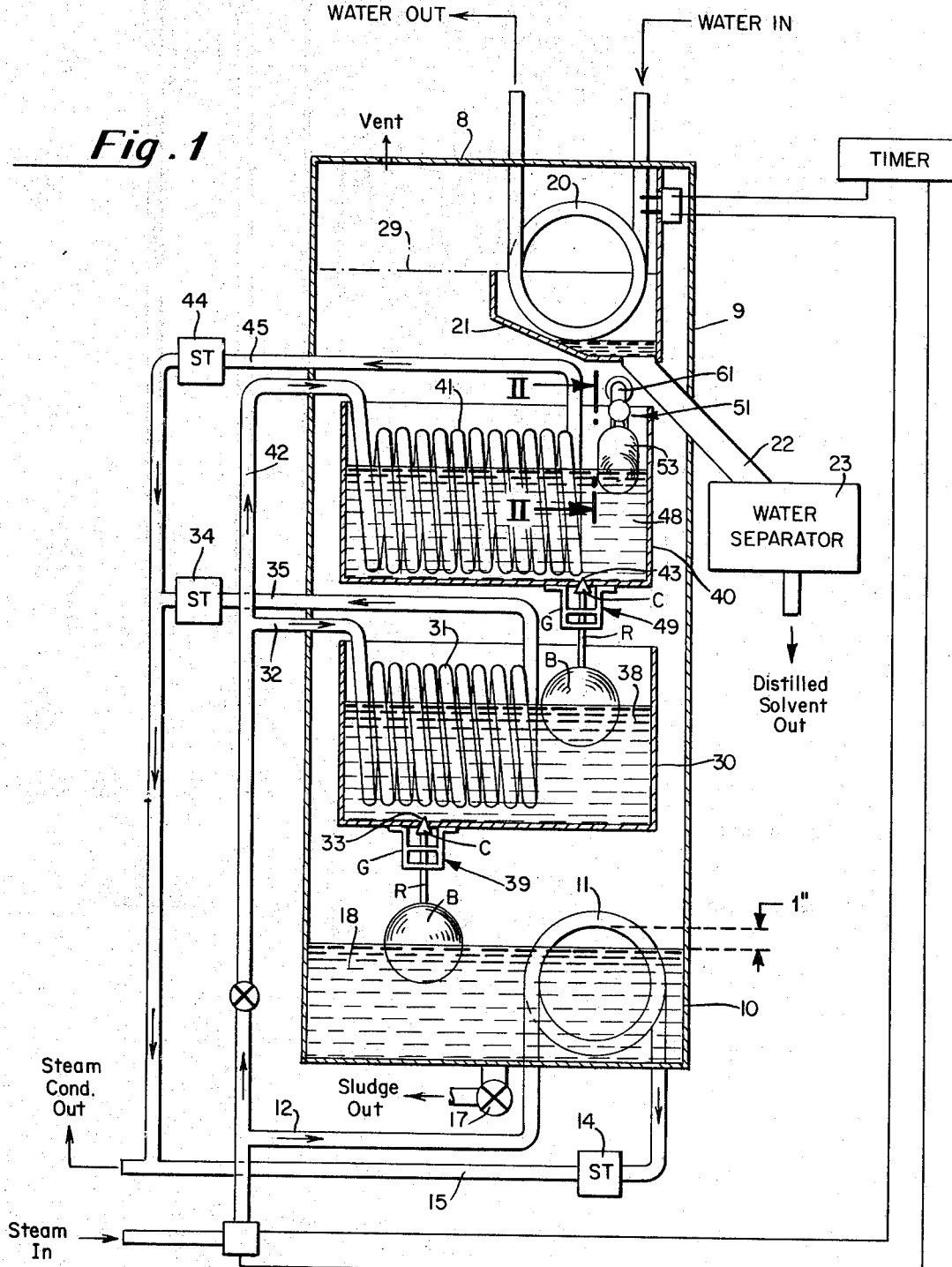
FIG. 1 is an elevational view, partly diagrammatic, of a still assembly embodying the present invention.

In FIG. 1 there is shown a still, having side walls 9 and a top cover 8 which may be vented to atmosphere. The main boil chamber 10 is at the lower portion of the still. Reference numeral 18 identifies the liquid level in the main boil chamber, the liquid level being controlled as later described. The vapor zone extends from the liquid level in the main boil chamber 10 to the vapor level 29 just below the cover 8.

Located in the upper corner of the still, and at least partially within the vapor zone, is a condenser coil 20 having therebeneath a condensate collection pan 21 having an opening therein which discharges the collected condensate through a piping 22 to a water separator 23.

Mounted in the main boil chamber 10 within the liquid zone is a steam coil 11 to which steam is applied through the steam input line 12. Steam condensate is discharged through the steam trap 14 and output piping 15. Also in the main boil chamber but not shown in the drawing is the usual type of sludge trap which is periodically drained through the sludge drain 17.

At least one, and preferably two, supplementary or auxiliary open-topped evaporator pans 40 and 30 are mounted one above the other within the still in the vapor zone. Each of the auxiliary evaporator pans 40 and 30 is provided with a steam coil 41 and 31, respectively, and supplied with steam from a common steam input line. Steam is applied to the upper coil 41 through the input line 42, and is applied to the lower coil 31 through the input line 32. Steam condensate is discharged through the steam traps 44 and 34 via the condensate output lines 45 and 35. Each of the auxiliary evaporator pans 40 and 30 is provided with a drain in its bottom, identified by the reference numerals 43 and 33, respectively. Valves 49 and 39 control whether the drains 43 and 33 are open or closed. Discharge pipings, not shown, may extend downwardly from each of the valves 49 and 39.

In accordance with a preferred embodiment of the present invention, each of the evaporator pans 40 and 30, and also the main boil chamber 10, is provided with a liquid level control valve so operative that the liquid levels in the evaporator pans 40 and 30, and in the main boil chamber 10, do not reach levels sufficiently high to submerge the respective steam coils. It has been discovered that unexpected and desirable results are obtained if the upper portions of the steam coils extend above the liquid level but not so far above as not to be bathed in liquid by the agitation of boiling. Stated another way, the portions of the steam coils which extend above the liquid levels are not to be exposed to the pure vapor atmosphere, but rather are to be bathed in liquid which is provided by the agitation of boiling. It has been found that this provides controlled bubbling out of moisture and of foam agents, and provides effective foam control without the adverse condition of accumulative build-up of contamination on exposed surfaces.

As indicated above, for best results, the liquid levels are so controlled that each of the steam coils 41, 31 and 11 have their upper portions extending above the liquid level to a limited extent. Lesser improved results are obtained if less than all three of the steam coils are so exposed.

Figure 2:
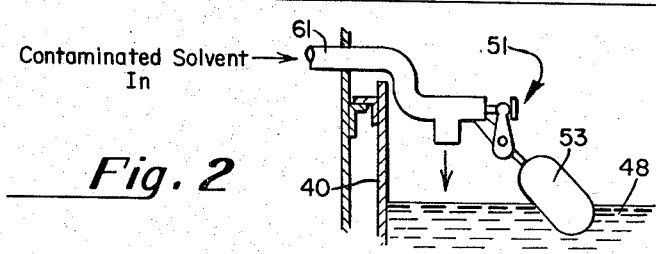
FIG. 2 is an illustration of a known form of float valve which may be used to control the liquid level in the upper evaporator pan.

To control the liquid levels in the evaporator pans 40 and 30 and in the main boil chamber 10, liquid level control valves 51, 49 and 39 are provided as shown. Valve 51 in the upper evaporator pan, shown in side elevation in FIG. 2, may be a known form of float control valve adapted to shut off the in-flow of contaminated solvent when the float ball 53 is raised by the rise of the liquid level in the upper evaporator pan 40 to the level 48 indicated in FIG. 1. The upper portion of the steam coil 41 may then project a couple of inches above the liquid level 48. In a typical case, the distance from the controlled liquid level to the under-surface of the exposed coils may be one inch. This dimension may apply to all three steam coils, and is indicated in FIG. 1 for coil 11.

While, so far as the basic concept of the present invention is concerned, the float control valves 51, 49 and 39 may take any known suitable form, I have shown the valves 49 and 39 as being of the type in which the float ball B is connected to the lower end of a vertical rod R which extends down through a guide member G from the closure element C. Thus, as the liquid level rises, the float ball B lifts the rod R and the closure element C to close the drain.

In operation, at start-up, the contaminated solvent flows in through the pipe 61, the valve 51, through the upper and lower auxiliary evaporator pans 40 and 30, and down into the main boil chamber 10. When the main boil chamber 10 fills to the flow control level 18, the flow control valve 39 closes and the lower auxiliary evaporator pan 30 begins to fill. When the liquid level in evaporator pan 30 reaches the flow control level 38, the flow control valve 49 closes and the upper evaporator pan 40 begins to fill. When the liquid level in the upper pan 40 reaches the flow control level 48, the flow control valve 51 closes, thereby shutting off the introdutcion of additional contaminated solvent through the piping 61 until the level in the upper pan 40 drops, at which time the flow control valve 51 opens to admit additional contaminated solvent.

During operation of the still at its maximum distillation rate, the levels in the main boil chamber 10 and in the lower and upper auxiliary pans 30 and 40 are automatically maintained. For it will be seen that as solvent and moisture are distilled from the main boil chamber 10, the liquid level 18 will drop opening the flow control valve 39 and allowing additional liquid to drop into the main boil chamber 10 from the lower pan 30. Such discharge of liquid from the lower pan 30, together with the loss of liquid from pan 30 through evaporation of solvent and moisture causes the liquid level 38 to drop, opening the flow control valve 49 and allowing additional liquid to drop into the lower pan 30 from the upper pan 40. Similarly, discharge of liquid from the upper pan 40 into the lower pan 30, together with the loss of liquid from the pan 40 through distillation of solvent and moisture causes the liquid level 48 to drop, opening the flow control valve 51 and allowing additional contaminated solvent to be introduced into the system until the liquid levels in vessels 10, 30 and 40 rise to the flow control levels and again close the flow control valves.

The operation described above is substantially similar to that described in my copending patent application Ser. No. 623,409, filed Mar. 15, 1967, and referred to above. The improvement disclosed and claimed in the present application relates to my discovery that unexpected and highly desirable results are obtained if the liquid levels in the evaporator pan or pans and in the main boil chamber are so controlled that the upper portions of the steam (or other heating) coils project above the liquid level by limited amounts so as to expose the heater's upper portion from the liquid while nevertheless bathing the exposed upper portion in the liquid by agitation of boiling. The result is a controlled bubbling out of moisture and foam agents without exposing the coil and pan surfaces to a pure vapor atmosphere. This achieves effective foam control without the adverse condition of accumulated build-up of contamination on exposed surfaces that has heretofore presented such a troublesome problem.

While I have shown as the heating elements steam coils 41, 31 and 11 of helical form, other forms and structures may of course be used for supplying the required heat to the evaporator pans and boil chamber.

While the preferred embodiment of this invention has been described in some detail, it will be obvious to one skilled in the art that various modifications may be made without departing from the invention as hereinafter claimed.

What is claimed is:

1. The method of separating volatile chlorinated hydrocarbons from liquid mixtures which also contain moisture and contaminants which tend to emulsify and foam during distillation, said method comprising the steps of:
(a) supplying the liquid mixture to a first upper level to form a pool thereof of substantial depth;
(b) subjecting the pool of liquid mixture at said first upper level to heat by less than full submersion of a heating element therein to boil the liquid and bathing the non-submerged portion of the heating element in liquid by the agitation of boiling for causing evaporation of at least moisture from the liquid;

(c) discharging the heated liquid mixture, from which moisture has been removed, from the lower portion of said pool to a final pool located at a level below the first, said final pool also having substantial depth;

(d) subjecting the liquid mixture in said final pool to further heat by less than full submersion of a heating element therein to boil the liquid and bathing the non-submerged portion of the heating element in liquid by the agitation of boiling to evaporate volatile chlorinated hydrocarbons from the liquid;

(e) condensing the vaporized solvent and collecting the condensate.

References Cited
UNITED STATES PATENTS

| | | | |
|---|---|---|---|
| 2,860,088 | 11/1958 | Plassmeyer | 202—170 |
| 3,011,956 | 12/1961 | Smith | 202—160 |
| 3,417,001 | 12/1968 | Fletcher | 202—181 |

WILBUR L. BASCOMB, JR., Primary Examiner

U.S. Cl. X.R.

203—1, 14, 71; 202—160, 173, 181